(12) United States Patent
Hirst

(10) Patent No.: US 7,180,534 B2
(45) Date of Patent: Feb. 20, 2007

(54) SCANNING ASSEMBLIES, PRINTING DEVICES, AND RELATED METHODS

(75) Inventor: B. Mark Hirst, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 192 days.

(21) Appl. No.: 10/636,878

(22) Filed: Aug. 7, 2003

(65) Prior Publication Data

US 2005/0030367 A1   Feb. 10, 2005

(51) Int. Cl.
*B41J 27/00* (2006.01)
(52) U.S. Cl. .................................. 347/243; 347/259
(58) Field of Classification Search ........ 347/241–243, 347/256–261, 231; 310/68 A–68 B, 166–168, 310/171–172, 179, 156.48–156.55, 90.5, 310/105, 90, 79, 93, 109, 145–146, 268, 310/184–185; 318/721, 759, 794, 781, 254; 73/514.06, 862.331; 505/166; 335/100
See application file for complete search history.

(56) References Cited

U.S. PATENT DOCUMENTS

| | | | | |
|---|---|---|---|---|
| 3,538,410 | A | * | 11/1970 | Welker ........................ 318/781 |
| 3,863,508 | A | * | 2/1975 | Scarborough et al. ... 73/514.06 |
| 4,275,343 | A | * | 6/1981 | Fulton et al. ................ 318/721 |
| 4,393,344 | A | * | 7/1983 | Whellams .................... 318/759 |
| 4,464,618 | A | * | 8/1984 | Shoemaker .................. 318/794 |
| 4,866,324 | A | * | 9/1989 | Yuzawa et al. .............. 310/268 |
| 4,892,863 | A | * | 1/1990 | Agarwala .................... 505/166 |
| 5,254,893 | A | * | 10/1993 | Ide .............................. 310/90 |
| 6,023,114 | A | * | 2/2000 | Mori et al. ................... 310/90 |
| 6,365,997 | B1 | * | 4/2002 | Werfel et al. ............... 310/90.5 |
| 6,455,970 | B1 | * | 9/2002 | Shafer et al. ................ 310/179 |
| 6,465,918 | B1 | * | 10/2002 | Itami et al. ............... 310/68 B |
| 6,532,831 | B2 | * | 3/2003 | Jin et al. ................. 73/862.331 |
| 6,765,358 | B1 | * | 7/2004 | Noble et al. ................ 318/254 |

FOREIGN PATENT DOCUMENTS

JP      10044397 A   *   2/1998

* cited by examiner

*Primary Examiner*—Hai Pham

(57) ABSTRACT

Scanning assemblies, printing devices, and related methods are described. In one embodiment, pole pieces are configured to be coupled with an input voltage source that can produce phase-shifted input voltages, the pole pieces defining at least first and second phases. A rotor is operably associated with the pole pieces for rotation. The pole pieces and the rotor are configured as an induction drive system in which a rotational force for rotating the rotor is produced through interaction of rotor-induced eddy currents from each of the first and second phases with respective magnetic fluxes of the other of the first and second phases.

51 Claims, 7 Drawing Sheets

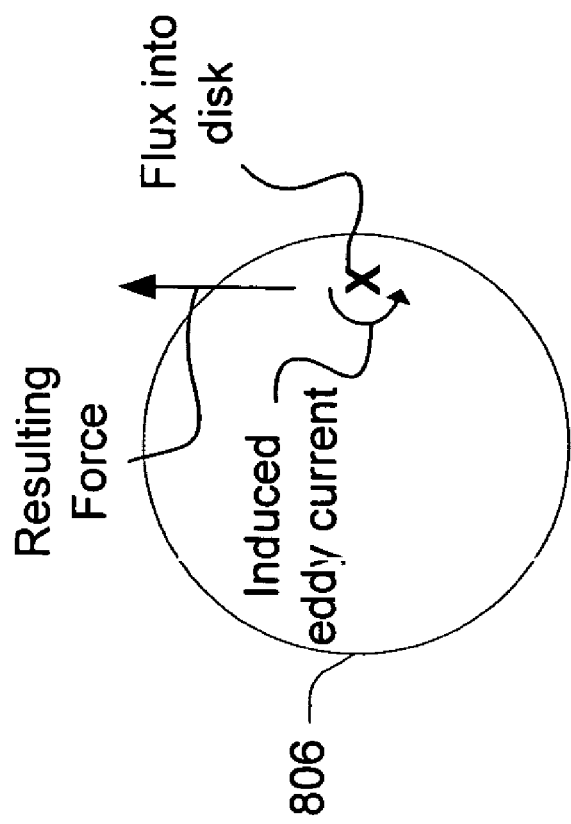
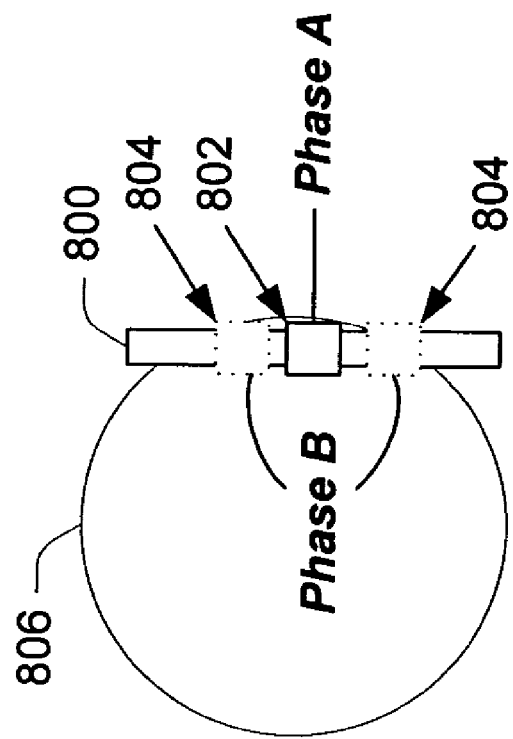
Fig. 5b
Fig. 5a $E_A$ = Voltage on Phase A $\phi_A$ = Flux in Phase A pole piece $i_A$ = Disk current due to $e_A$ $e_A$ = Disk voltage induced by flux from Phase A ($\phi_A$)

$I_B$ = Current through Phase B $\phi_B$ = Flux in Phase B pole piece $i_B$ = Disk current due to $e_B$ $e_B$ = Disk voltage induced by flux from Phase B pole piece ($\phi_B$)

$\theta$ Phase angle between voltage of Phase A and current of Phase B

Disk torque is due to 2 components - the interaction of induced Disk current due to Phase B with the flux of Phase A, and the induced disk current due to Phase A with the flux of Phase B

Fig. 6

SCANNING ASSEMBLIES, PRINTING DEVICES, AND RELATED METHODS

BACKGROUND

Typically, laser printers use a laser scanning system to produce a printed image. The laser scanning systems typically utilize a highly polished aluminum polygon mirror which is attached to a shaft which is part of the rotor of a brushless DC motor. The laser scanning system produces a laser beam which is projected toward the polygon mirror. The polygon mirror is rotated under the influence of the brushless DC motor in a manner that reflects the laser and scans the laser across a rotating photoconductive drum. As the laser beam is scanned across the drum, it is modulated by data corresponding to the image that is to be printed on a print medium such as paper. As a result of the scanning of the laser over the photoconductive drum, a latent image is produced thereon and toner, which is attracted to selected areas of the drum, is then transferred from the drum onto a print medium where it is fused onto the print medium to produce a printed image.

Some conventional laser scanning systems are expensive to manufacture, difficult to align and balance, consume large amounts of power, and require large amounts of time to spin-up. Accordingly, for these and other reasons, a need exists for the present system and method.

BRIEF DESCRIPTION OF THE DRAWINGS

FIG. 5a is a top diagrammatic view of a disk and portions of the compound pole piece of FIG. 5, in accordance with one embodiment.

FIG. 5b is a diagrammatic view that illustrates a resulting force that is developed by one phase of the FIG. 5 compound pole piece, in accordance with one embodiment.

FIG. 6 is an example vector diagram of the FIG. 5 compound pole piece.

DETAILED DESCRIPTION

Overview

The various embodiments described below provide scanning assembly constructions that can reduce the number of pole pieces that are incorporated into the drive system. The various constructions constitute lighter weight assemblies and rotor constructions that address many of the shortcomings of the present systems. For example, some of the described embodiments, by virtue of their lighter constructions, can spin up faster than some conventional scanning assemblies. This, in turn, reduces the time that it takes to produce a printed page. In addition, some of the various embodiments can be less costly to construct.

In various embodiments, the scanning assembly comprises a motor drive assembly comprising an induction drive system. More specifically, the drive system comprises a multi-phase induction drive system which, in some embodiments, utilizes the mirror as the rotor of the motor. In these embodiments, the material from which the mirror is constructed is used as the medium in which eddy currents are induced to generate a rotating magnetic field which is utilized to rotate or spin the mirror. In other embodiments, a rotor structure independent of the mirror is provided and serves as the medium in which the eddy currents are induced.

In various embodiments, the induction drive system constitutes a construction in which the rotational motion of the mirror is imparted by a magnet-less collection of components. Of course, in these embodiments, an external drag magnet can be incorporated externally of the drive system to control the rotational velocity of the mirror.

Exemplary Printer System

Figure 1:
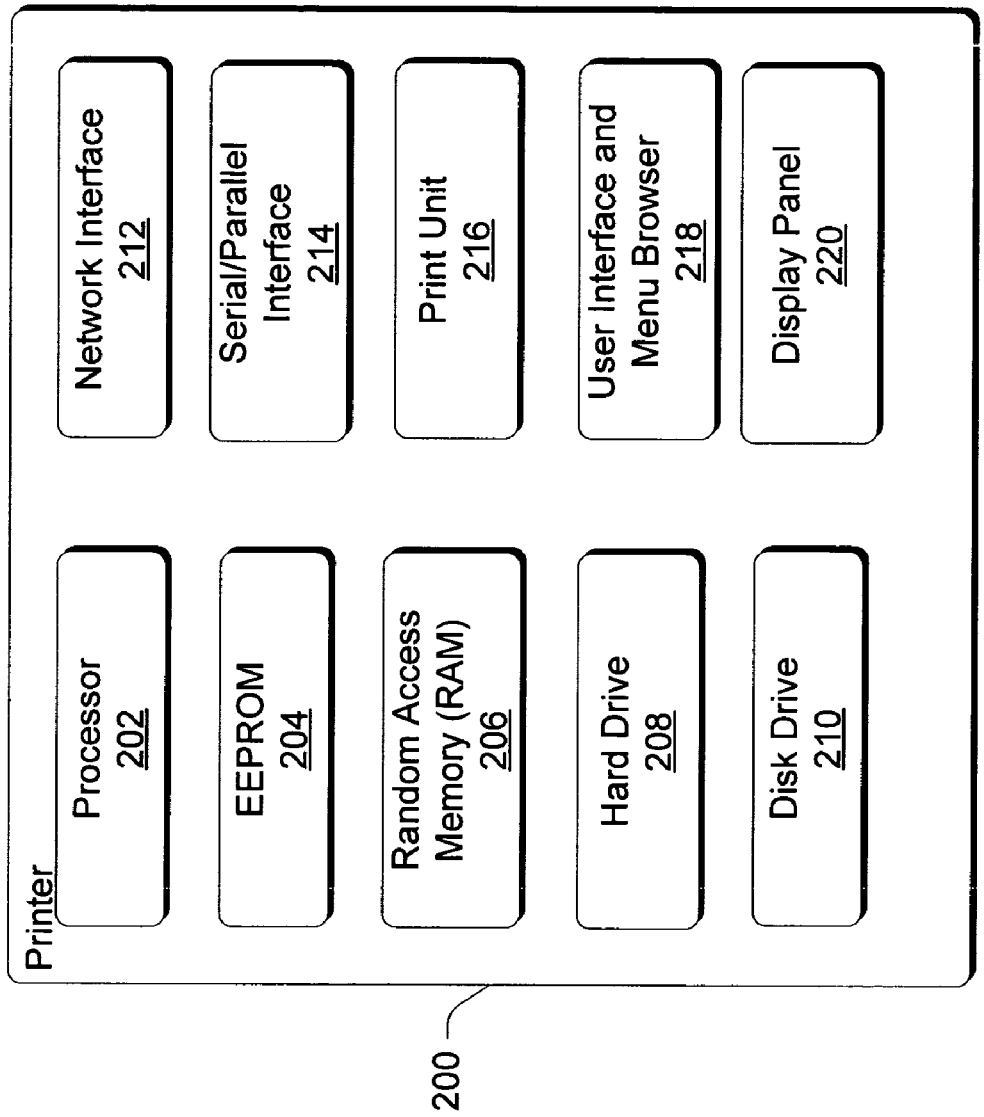
FIG. 1 is a block diagram of a printing device in connection with which one or more embodiments can be implemented.

FIG. 1 is a block diagram showing exemplary components of a printing device in the form of a printer 200 that can be used in accordance with the described embodiments. While FIG. 1 illustrates a specific type of printing device, it should be appreciated that other printing devices such as copiers, scanners, and multifunction devices (i.e. devices that print, copy, fax and the like) can be utilized without departing from the spirit and scope of the claimed subject matter.

Printer 200 includes a processor 202 and at least one computer-readable media. In this example, the computer readable media can include an electrically erasable programmable read-only memory (EEPROM) 204 and a random access memory (RAM) 206. Further, the computer-readable media can include hard drive 208. Processor 202 processes various instructions necessary to operate the printer 200 and communicate with other devices. EEPROM 204, RAM 206, and/or hard drive 208 can store various information such as configuration information, fonts, templates, data being printed, and menu structure information.

Printer 200 can also include a disk drive 210, a network interface 212, and a serial/parallel interface 214. Disk drive 210 provides additional storage for data being printed or other information used by the printer 200. Network interface 212 provides a connection between printer 200 and a data communication network. Network interface 212 allows devices coupled to a common data communication network to send print jobs, menu data, and other information to printer 200 via the network.

Serial/parallel interface 214 can also provide a data communication path directly between printer 200 and another device, such as a workstation, server, or other computing device. Although the printer 200 shown in FIG. 1 has two interfaces (network interface 212 and serial/parallel interface 214), a particular printer may only contain one interface.

Printer 200 also includes a print unit 216 that includes mechanisms that are arranged to selectively apply toner to a print media (e.g., paper, plastic, fabric, etc.) in accordance with print data within a print job. Thus, for example, print unit 216 can include a laser printing mechanism that selectively causes toner to be applied to an intermediate surface of a drum or belt. The intermediate surface can then be brought within close proximity of a print media in a manner that causes the toner to be transferred to the print media in a controlled fashion. The toner on the print media can then be more permanently fixed to the print media, for example, by selectively applying thermal energy to the toner. Part of print unit 216 can comprise a multi-phase inductive drive system, embodiments of which are described in more detail below.

Printer 200 can also contain a user interface/menu browser 218 and a display panel 220. User interface/menu browser 218 allows the user of the printer to navigate the printer's menu structure. User interface 218 may be a series of buttons, switches or other indicators that are manipulated by the user of the printer. Display panel 220 is a graphical display that provides information regarding the status of the printer and the current options available through the menu structure.

First Exemplary Embodiment—Inductive Mirror Rotor

Figure 2:
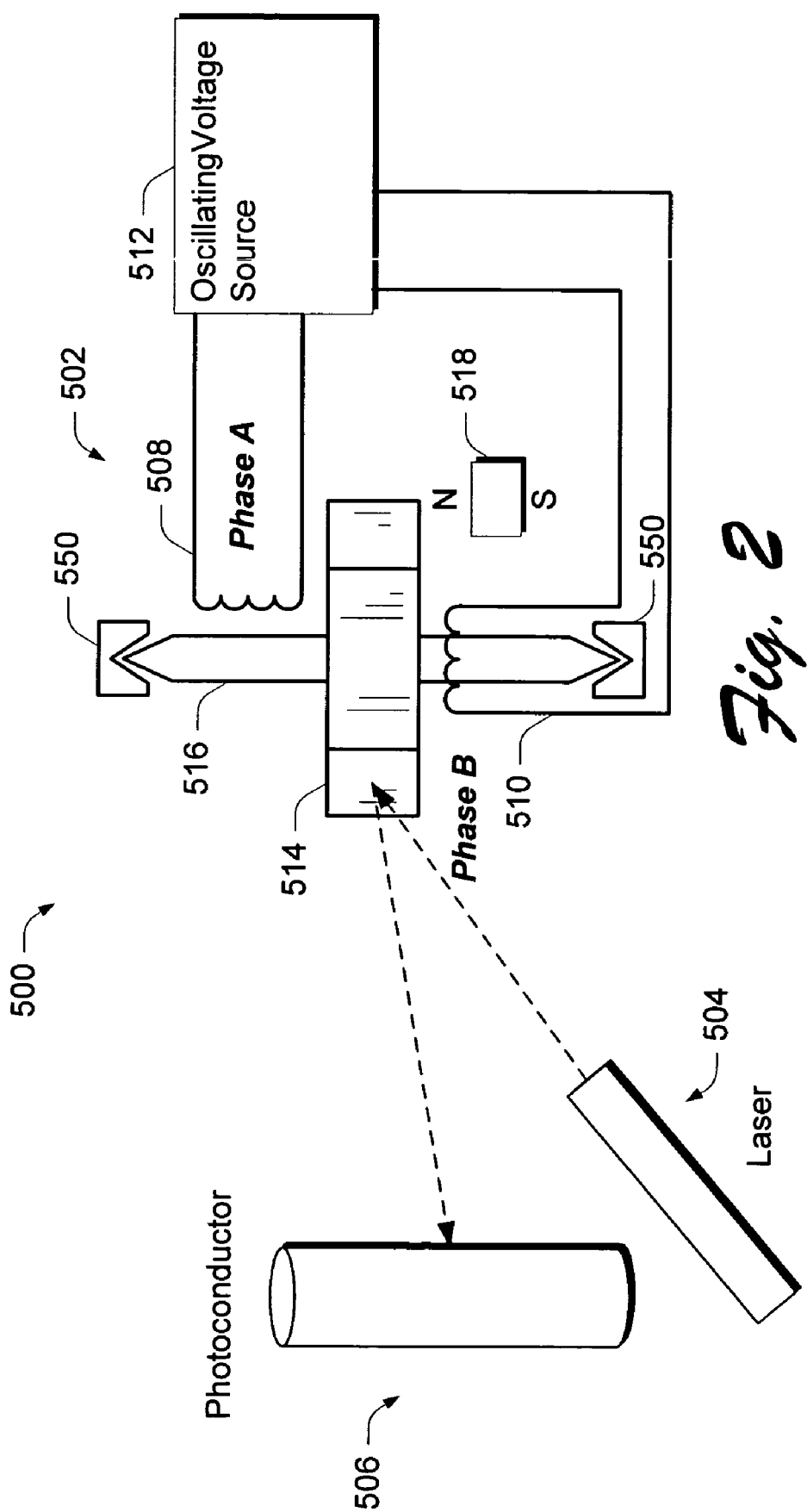
FIG. 2 is a diagram that illustrates components of a printing device scanning assembly in accordance with one embodiment.

FIG. 2 diagrammatically illustrates components of a printing device scanning assembly in accordance with one embodiment generally at 500. The illustrated components comprise, in this example, an inductive drive system 502, a laser source 504, and a photoconductor 506.

Inductive drive system 502 comprises, in this embodiment, a two-phase inductive motor having a stator comprising two pole pieces 508, 510 each with respective windings or coils. In the illustrated figure, pole pieces 508, 510 are intended to diagrammatically represent and comprise both the structure around which the windings or coils are disposed, as well and the windings or coils themselves. Pole piece 508 provides the first phase (phase A) of the inductive drive system and pole piece 510 provides the second phase (phase B) of the drive system. An oscillating voltage source 512 is provided and is configured to produce drive voltages and currents which, in this example, are sinusoidal (or approximated sinusoids) in nature. Pole pieces 508, 510 are physically arranged on the stator such that they provide individual flux paths that are oriented generally 90-degrees from each other to allow the magnetic fields to interact with induced currents to produce a resulting force vector on the rotor that causes it to rotate, as will be appreciated by the skilled artisan.

A rotor is provided in the form of a mirror 514 comprising one or more facets, three of which being shown in the illustration. The mirror is connected to a shaft 516. The ends of the shaft can comprise needle bearings, cupped jewel bearings, or any other suitable structure 550 that can serve as a mounting structure that allows the rotor to rotate. One such structure is a single bearing such as that described in connection with FIG. 3. The mirror can have any suitable number of facets, e.g. 2, 3, 4 or more. As such, the term polygon mirror will be understood to refer to mirrors having one or more facets.

Each facet of the mirror is utilized to reflect a laser beam produced by laser source 504 towards the photoconductor 506. Each facet of the mirror corresponds to one scan line on the photoconductor. In the illustrated and described embodiment, the mirror is formed from a material in which the eddy currents can be produced by the inductive drive system. In the present example, the mirror is made from a piece of aluminum that is machined and ground optically flat to provide the multiple facets. Other suitable materials may alternatively be used to form the mirror. In this example, the material of the mirror itself comprises the rotor of the inductive drive system. An optional drag magnet 518 can be provided to induce a drag in the rotational velocity of the spinning mirror so that a desirable velocity is maintained. In implementations in which a drag magnet is not used, the maximum velocity of the rotor is limited by the magnetic flux of the pole assembly and the mechanical losses due to bearing friction and air drag on the rotating mirror.

Figure 5:
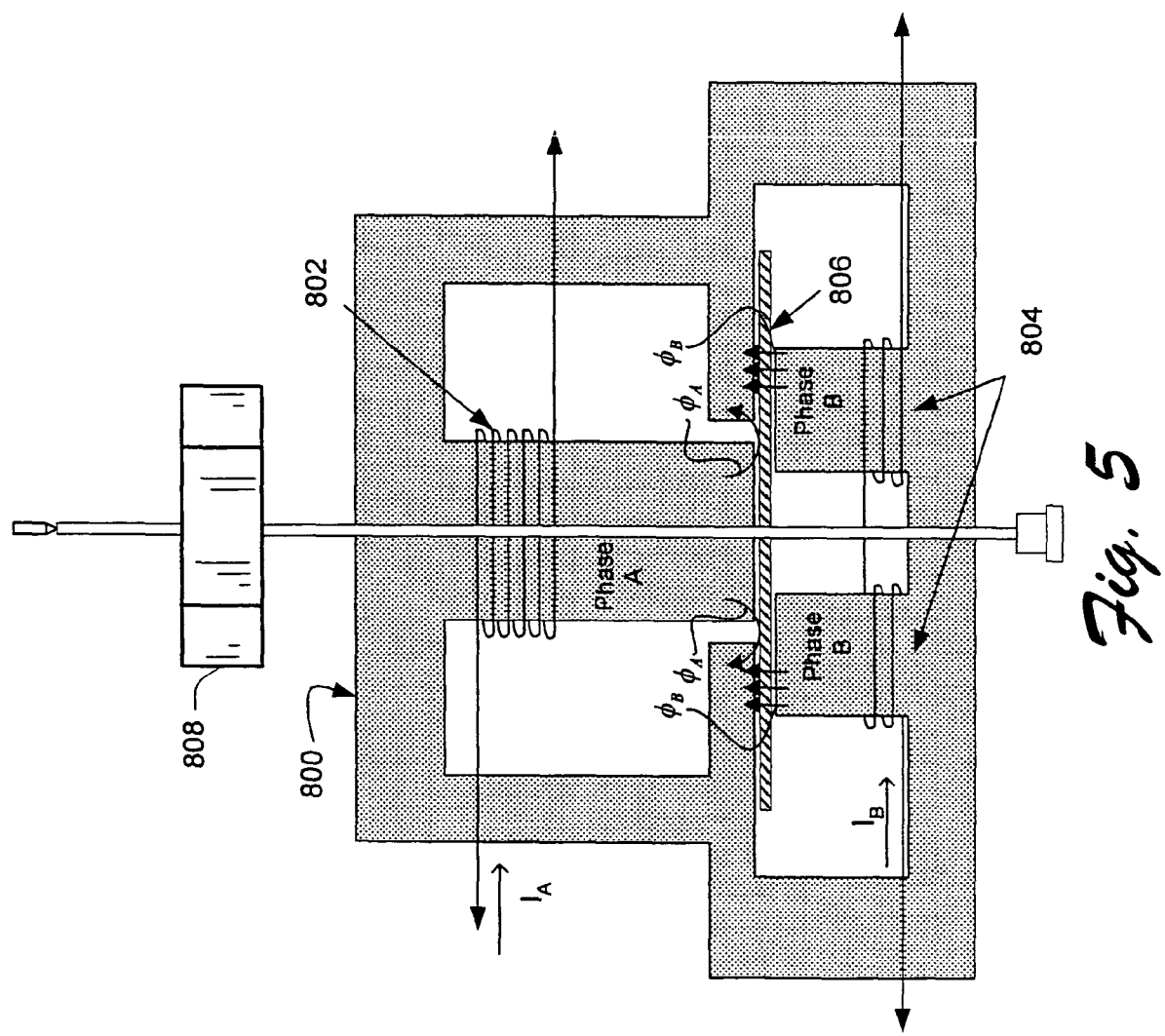
FIG. 5 is a diagram that illustrates an exemplary compound pole piece in accordance with one embodiment.

In the present example, pole piece 508 is mounted over the mirror 514 and pole piece 510 is mounted under the mirror with suitable gaps to provide the desired effect. The pole pieces can be provided as separate pole pieces or as a compound pole piece in which both coils are disposed on an integral structure comprising the pole piece. An example of the latter is shown in FIG. 5 and described in the section just below entitled "Compound Pole Piece". There, one pole piece (corresponding to phase A) is mounted over the component in which the eddy currents are induced, and the other pole piece (corresponding to phase B) is mounted under the component in which the eddy currents are induced.

Compound Pole Piece

FIG. 5 shows an exemplary structure that includes the over/under mounting arrangement of the pole pieces in connection with another embodiment.

Specifically, in the embodiment shown in FIG. 5, the pole pieces can be provided as a compound pole piece in which both sets of coils are disposed on an integral structure comprising the pole piece. In the FIG. 5 illustration, compound pole piece 800 comprises a first pole piece 802 having an associated winding (thus constituting a first phase A), and a second pole piece 804 having associated windings (thus constituting a second phase B). In this particular example, a disk or plate 806 is provided as the rotor and can be used in connection with a mirror, such as mirror 808 mounted on the shaft outside of the compound pole piece. The shaft can comprise one that is similar to those that are typically used. Additionally, the shaft can be associated with one or more bearings in a manner which will be understood and appreciated by the skilled artisan.

FIG. 5a shows a top view of the disk 806 and pole piece 800. Here, the coil windings are illustrated as square boxes, with designations to indicate Phase A and Phase B. Here, the Phase A windings are mounted over the disk 806, and the Phase B windings are mounted under the disk 806. Notice that the pole pieces are disposed very near the edge of the disk in order to provide an increased moment arm, which facilitates the spinning up of the disk, as will be appreciated by those of skill in the art. Additionally, it should be noted that while the rotor in this example comprises a disk, the rotor could well be embodied as a mirror, as in the FIG. 2 example.

FIG. 5b shows the effects of one phase of the described multi-phase motor. Specifically, the "X" indicates the magnetic flux into the disk from Phase B. This flux induces an eddy current which is shown by the circular arrow around the "X". The interaction of this induced eddy current with the flux from the other phase (Phase A)—gives rise to the illustrated resulting force. In a similar way, the flux from Phase A induces an eddy current in the mirror whose interaction with the flux from Phase B gives rise to a force in the same direction as the illustrated force. These resulting forces provide the force vector that rotates the disk or, in embodiments that utilize a mirror as the rotor, rotates the mirror.

To further assist in understanding this dynamic, consider FIG. 5 in connection with the vector diagram of FIG. 6 and the following discussion. Given the magnetic orientation of the pole piece in FIG. 5, the voltages applied to phases A and B cause currents $I_A$ and $I_B$ to flow through the coils. These currents are illustrated in FIG. 5, while only one of the currents $I_B$ is illustrated in the vector diagram of FIG. 6. These currents flow respectively into phase A and B and are 90 degrees out of phase. The voltage on phase A is represented as $E_A$ in the vector diagram. Because of the voltage $E_A$ on phase A, the current $I_A$ will flow in phase A. This current produces a flux $\phi_A$ which is proportional to the number of turns in coil 802 and the current $I_A$ flowing through the coil 802. In the illustration of FIG. 5, flux $\phi_A$ flows through pole piece 802, jumps the air gap into the disk 806, and then flows back into pole piece 800 to close the magnetic circuit. This flux travels along the top surface of the disk 806. Flux $\phi_A$ induces a disk voltage $e_A$ which gives rise to a disk current $i_A$, which is an eddy current that flows in the surface of the disk to oppose $\phi_A$. This eddy current $i_A$ interacts with the flux from Phase B ($\phi_B$) to give rise to a force component that rotates disk 806.

Likewise, with respect to Phase B, the voltage applied to phase B ($E_B$) causes the current $I_B$ to flow in the phase B coils. This current produces a flux $\phi_B$ (as indicated in FIG. 5) which, in turn, induces a disk voltage $e_B$ which gives rise to a disk current $i_B$, which is an eddy current that interacts with the flux from phase A ($\phi_A$) which gives rise to an additional force component that rotates disk 806. The resultant force component can be described by the following equation:

$$F=(i_B \times \phi_A)+(i_A \times \phi_B)$$

This equation states that the resulting force that is applied to the disk 806 (or mirror in appropriate embodiments), constitutes the sum of the cross products of the induced eddy currents from one phase and the flux from the other phase, as will be understood by the skilled artisan.

Second Exemplary Embodiment—Inductive Metal Plate Rotor

Figure 3:
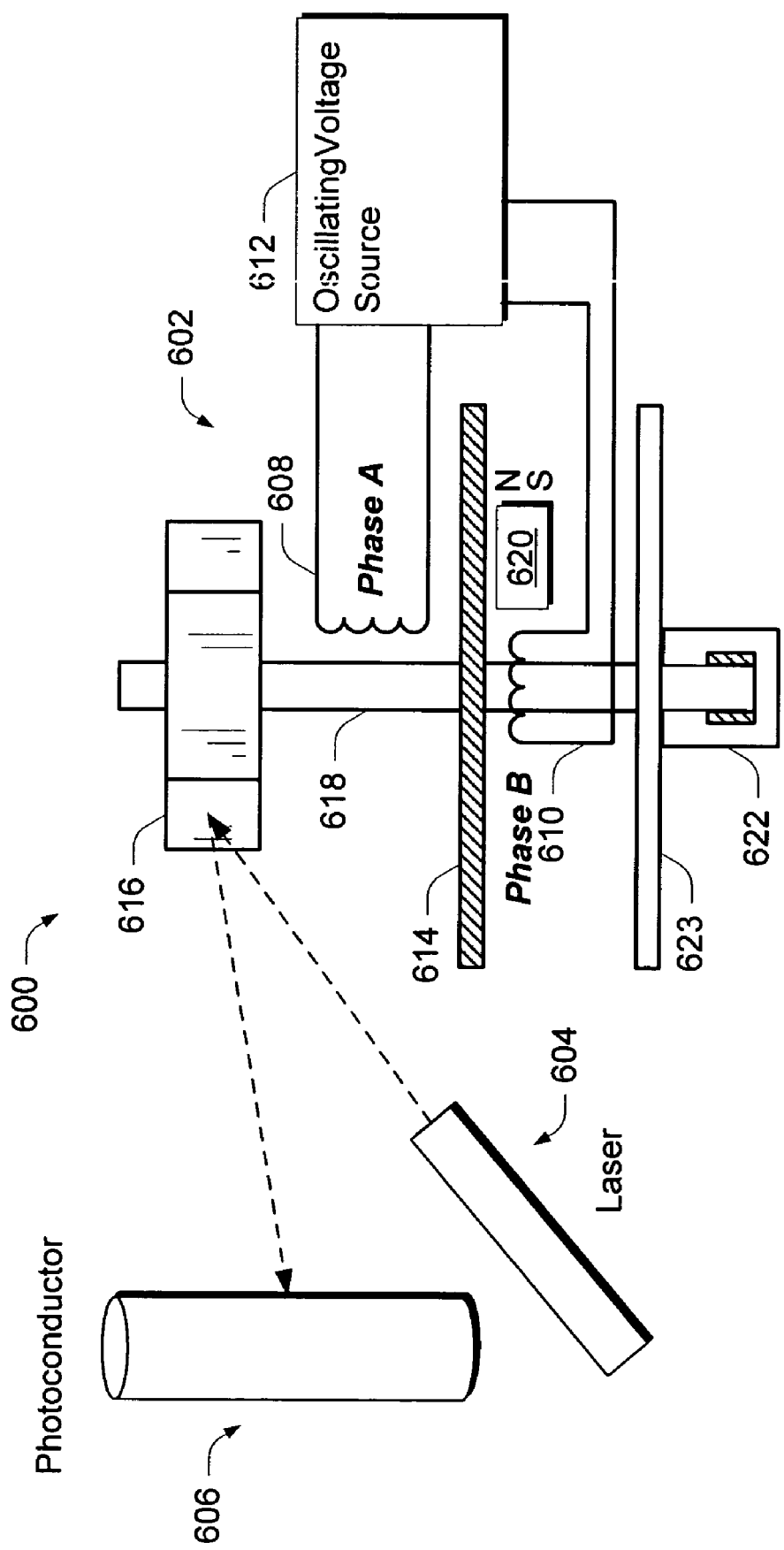
FIG. 3 is a diagram that illustrates components of a printing device scanning assembly in accordance with another embodiment.

FIG. 3 illustrates components of a printing device scanning assembly in accordance with one embodiment generally at 600. The illustrated components comprise, in this example, an inductive drive system 602, a laser source 604, and a photoconductor 606.

Inductive drive system 602 comprises, in this embodiment, a two-phase inductive motor having a stator comprising two pole pieces 608, 610 each with respective windings or coils. The stator can comprise any suitably configured stator that is structured to provide flux paths that are generally oriented 90 degrees to one another. In the example described just above in connection with FIG. 5, the pole piece was provided in the form of a compound pole piece. Alternately, the pole pieces can be provided as separate pole pieces, as will be appreciated by the skilled artisan.

Pole piece 608 provides the first phase (phase A) of the inductive drive system and pole piece 610 provides the second phase (phase B) of the drive system. An oscillating voltage source 612 is provided and is configured to produce drive voltages and currents which in this example are sinusoidal (or approximated sinusoids) in nature, similar to those voltages described above in connection with FIG. 2. Pole pieces 608, 610 are physically arranged on the stator such that they give rise to magnetic flux paths that are disposed generally 90-degrees relative to one another.

A rotor is provided in the form of a sheet, disk or plate of conductive material 614. In this example, the rotor comprises a stamped sheet of metal such as aluminum. A mirror 616 is provided and comprises multiple facets, three of which being shown in the illustration. Rotor 614 and mirror 616 are connected to a shaft 618. The ends of the shaft can comprise needle bearings, cupped jewel bearings, or any other suitable structure that can serve as a mounting structure that allows the rotor to rotate. In this particular example, a single bearing structure 622 is provided and shaft 618 is seated in the bearing structure in a manner which permits the shaft to rotate under the influence of rotor 614. A support plate 623 is provided and is joined with single bearing structure 622.

Each facet of the mirror is utilized to reflect a laser beam produced by laser source 604 towards the photoconductor 606. Each facet of the mirror corresponds to one scan line on the photoconductor. In this illustrated and described embodiment, the mirror is not utilized as the rotor of the inductive drive system.

Optional drag magnet 620 can be provided to induce a drag in the rotational velocity of the spinning rotor so that a desirable velocity is maintained.

In the present example, pole piece 608 is mounted over the rotor 614 and pole piece 610 is mounted under the rotor 614 with suitable gaps to provide the desired effect. The pole pieces can be provided as separate pole pieces. Alternately, the pole pieces can be provided as a compound pole niece in which both coils are disposed on the pole piece. An example of such a compound pole piece is shown and described in FIG. 5.

In Operation

Figure 4:
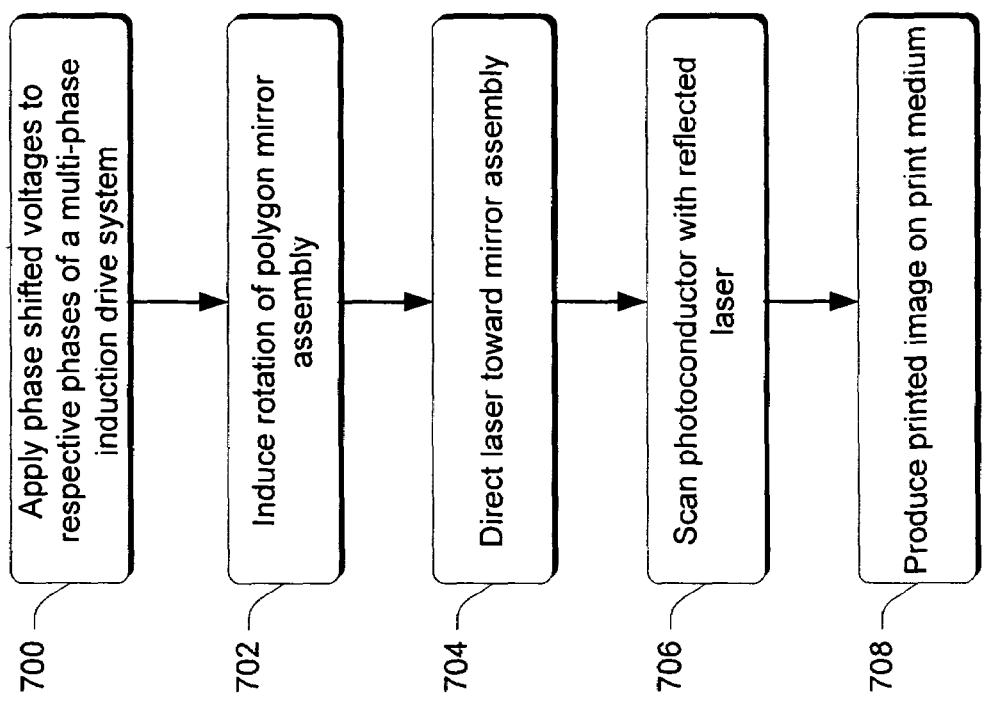
FIG. 4 is a flow diagram that describes steps in a method in accordance with one embodiment.

FIG. 4 is a flow diagram that describes steps in a method in accordance with one embodiment. The method can be implemented in connection with any suitably-configured laser printing device having a multi-phase induction drive system.

Step 700 applies phase-shifted voltages to respective phases of a multi-phase induction drive system of the laser printing device. Any suitable multi-phase induction drive system can be utilized, e.g. two- or three-phase systems. In the embodiments described above, various two-phase induction drive systems are utilized. Applying the phase-shifted voltages gives rise to the magnetic fluxes, eddy currents, and interaction therebetween, as described above, sufficient to rotate the motor's rotor.

Responsive to applying the phase-shifted voltages, step 702 induces rotation of the laser printer's mirror. This step can be implemented in different ways. For example, in some embodiments, the mirror itself is used as the rotor of the induction drive system. An example of this type of mirror is shown and described in connection with FIG. 2. In this case, step 702 induces rotation of the mirror by acting directly on the mirror. In other embodiments, the mirror is not used as the rotor of the induction drive system. Rather, a separate rotor structure is provided. For example, FIG. 3 illustrates a rotor structure comprising stamped sheet metal mounted on a shaft that is shared with the mirror. In this case, step 702 induces rotation of the mirror by acting directly on the rotor which, in this case, does not comprise the mirror.

Step 704 directs a laser towards the rotating mirror and step 706 scans a photoconductor with the reflected laser beam. Step 708 then produces a printed image on a print medium such as paper.

Design Considerations

In implementing the various embodiments described above, there are a number of considerations that can be taken into account. For example, the amount of magnetic flux that is created is a function of the current flowing through the coils and the number of turns. Thus, designers may consider this aspect depending on the particular requirements and materials of the system. In addition, the spacing or air gap between the pole piece(s) and the rotor itself may also be considered because the magnetic reluctance changes dramatically as the air gap changes.

The above-described embodiments can use very low voltages to induce enough magnetic flux to provide the necessary force to start the mirror rotating. In some embodiments, it may be desirable to provide as much flux as possible without damaging the coils or requiring excessive cost to the drive electronics.

The phases or coils can be operated upon in different ways. For example, a pulse width modulated representation of a sine wave can be used to drive the coils. Alternately, a linear amplifier can be used to actually generate a sine wave. Using a high frequency pulse width modulated representation of the sine wave can lead to high switching losses which are undesirable. Using a linear amplifier, on the other hand, leads to amplifier losses. Depending on the frequency chosen to implement a pulse width modulated representation of a sign wave the losses between the two different approaches can be fairly close.

CONCLUSION

The above-described embodiments can reduce the mass of the rotor in the scanning assembly of the printing device thus enabling the mirror to be spun up faster. Additionally, the drive electronics can be simplified in that instead of having an integrated circuit with a number of different stages, flux sensors, and the other components needed to operate and regulate a brushless DC motor, the induction drive system is much simpler in design. For example, the induction drive system has a reduced number of pole pieces with a reduced number of outputs. In the examples described above, there are four outputs—one for each tap on a coil. That is, there are two taps on each coil. This means that there are only four wires coming out of the integrated circuit that synthesizes the sinusoidal wave form. The number of outputs can actually be reduced further in the event the coils use a common return. In that case, there would be three wires coming out of the integrated circuit.

Additionally, various embodiments described above can reduce polygon mounting errors which, in turn, can reduce facet angle errors and scan length errors.

Although the invention has been described in language specific to structural features and/or methodological steps, it is to be understood that the invention defined in the appended claims is not necessarily limited to the specific features or steps described. Rather, the specific features and steps are disclosed as example forms of implementing the claimed invention.

What is claimed is:

1. An apparatus comprising:
    pole pieces configured to be coupled with an input voltage source that can produce phase-shifted input voltages, the pole pieces defining at least first and second phases;
    a rotor operably associated with the pole pieces for rotation, wherein the pole pieces and the rotor are configured as an induction drive system in which a rotational force for rotating the rotor is produced through interaction of rotor-induced eddy currents from each of the first and second phases with respective magnetic fluxes of the other of the first and second phases; and
    mirror facets coupled to the rotor so as to rotate with the rotor.

2. The apparatus of claim 1, wherein the rotor provides the mirror facets.

3. The apparatus of claim 1, wherein a member connected to the rotor providing the mirror facets.

4. The apparatus of claim 1, wherein the rotor is non-magnetic and comprises a sheet of conductive material.

5. The apparatus of claim 1, wherein the rotor comprises a sheet of aluminum.

6. The apparatus of claim 1, wherein the pole pieces and the rotor are configured as a two-phase induction drive system.

7. The apparatus of claim 1, wherein the pole pieces comprise two pole pieces that are mounted sufficient to provide individual flux paths that are oriented generally 90-degrees relative to one another.

8. The apparatus of claim 1 further comprising a shaft having two ends and being connected with the rotor, wherein the shaft comprises a bearing at each end.

9. The apparatus of claim 1 further comprising a shaft having two ends and being connected with the rotor, wherein the shaft comprises a single bearing at one end which serves as a mounting structure for the shaft.

10. The apparatus of claim 1 further comprising a drag magnet mounted to induce a drag in rotor velocity.

11. The apparatus of claim 1 further comprising a photoconductor configured to receive light reflected from the mirror facets.

12. The apparatus of claim 1, wherein the rotor includes a non-magnetic portion in which eddy currents producing the rotational force are induced.

13. A scanning assembly comprising:
    pole pieces configured to be coupled with an input voltage source, the pole pieces define at least first and second phases;
    a shaft mounted in the laser scanning assembly for rotation;
    a mirror comprising material that provides a rotor, the mirror being mounted on the shaft;
    the pole pieces and the mirror being configured as an induction drive system in which a rotational force for rotating the mirror is produces through interaction of mirror-induced eddy currents from each of the first and second phases with respective magnetic fluxes of the other of the first and second phases.

14. The scanning assembly of claim 13, wherein the pole pieces and the mirror are configured as a two-phase induction drive system.

15. The scanning assembly of claim 13, wherein the pole pieces comprise two pole pieces that are mounted sufficient to provide individual flux paths that are oriented 90-degrees relative to one another.

16. The scanning assembly of claim 13, wherein the shaft comprises a needle bearing at each end.

17. The scanning assembly of claim 13, wherein shaft comprises a single bearing at one end which serves as a mounting structure for the shaft.

18. The scanning assembly of claim 13 further comprising a drag magnet mounted to induce a drag in the rotational velocity of the rotor.

19. The scanning assembly of claim 13, wherein the mirror includes a non-magnetic portion in which eddy current producing the rotational force are induced.

20. A scanning assembly comprising:
    pole pieces configured to be coupled with an input voltage source, the pole pieces defining at least first and second phases;
    a shaft mounted in the scanning assembly for rotation;
    a mirror mounted on the shaft;
    a rotor structure mounted on the shaft; and
    the pole pieces and the rotor structure being configured as an induction drive system in which a rotational force for rotating the rotor is produced through interaction of rotor-induced eddy currents from each of the first and second phases with respective magnetic fluxes of the other of the first and second phases.

21. The scanning assembly of claim 20, wherein the rotor structure is nonmagnetic and comprises a sheet of conductive material.

22. The scanning assembly of claim 20, wherein the rotor structure comprises a sheet of conductive material comprising aluminum.

23. The scanning assembly of claim 20, wherein the pole pieces and the rotor structure are configured as a two-phase induction drive system.

24. The scanning assembly of claim 20, wherein the pole pieces comprise two pole pieces that are mounted sufficient to provide flux paths that are oriented generally 90-degrees relative to one another.

25. The scanning assembly of claim 20, wherein the shaft comprises a needle bearing at each end.

26. The scanning assembly of claim 20, wherein the shaft comprises a single bearing at one end which serves as a mounting structure for the shaft.

27. The scanning assembly of claim 20 further comprising a drag magnet mounted to induce a drag rotor structure velocity.

28. The scanning assembly of claim 21, wherein the rotor includes a non-magnetic portion in which eddy currents producing the rotational force are induced.

29. A laser printer comprising:
a voltage source configured to produce phase-shifted voltages;
pole pieces operably coupled with the voltage source, the pole pieces defining at least first and second phases;
a shaft mounted in the laser printer for rotation;
a rotor mounted on the shaft;
mirror facets coupled to the rotor;
a laser source configured to produce a laser;
a photoconductor proximate the laser source and configured to be scanned by the laser; and
the voltage source, pole pieces and rotor being configured as an induction drive system in which a rotational force for rotating the rotor is produced through interaction with rotor-induced eddy currents from each of the first and second phases with respective magnetic fluxes of the other of the first and second phases.

30. The laser printer of claim 29, wherein the rotor comprises a mirror providing the facets towards which the laser is directed.

31. The laser printer of claim 29 further comprising a mirror mounted on the shaft separate from the rotor.

32. The laser printer of claim 29, wherein the voltage source is configured to produce two phase-shifted voltages.

33. The laser printer of claim 29, wherein the voltage source is configured to produce two phase-shifted voltages, and the pole pieces comprise two pole pieces that are mounted sufficient to provide flux paths that are oriented generally 90-degrees relative to one another.

34. An apparatus comprising:
a mirror comprising facets, at last some of the facets being configured to reflect a laser beam towards a photoconductor; and
the mirror being configured as a rotor for an induction drive system in a laser printing device in which a rotational force for rotating the mirror is produced through interaction of mirror-induced eddy currents from the induction drive system with respective magnetic fluxes provided by the induction drive system.

35. The apparatus of claim 34, wherein the mirror comprises at least 6 facets.

36. The apparatus of claim 34, wherein the assembly comprises at least 3 facets.

37. An apparatus comprising:
means for applying individual phase-shifted voltages to individual respective phases of a multi-phase induction drive system of a laser printing device scanning assembly to create eddy currents in a mirror;
means for inducing rotation of the mirror using the eddy currents;
means for directing a laser beam towards the rotating mirror;
means for scanning a photoconductor with a laser beam reflected off of the mirror; and
means for producing a printed image on a print medium responsive to scanning the photoconductor.

38. The apparatus of claim 37, wherein the means for applying the phase-shifted voltages comprises means for applying two phase-shifted voltages.

39. The apparatus of claim 37, wherein the means for applying the phase-shifted voltages comprises means for applying at least two phase-shifted voltages.

40. A method comprising:
positioning pole pieces relative to an input voltage source configured to produce phase-shifted input voltages that are provided to the pole pieces, the pole pieces defining at least first and second phases;
mounting a rotor on a shaft for laser scanning rotation; and
providing mirror facets coupled to the rotor; and
the voltage source, pole pieces and rotor being configured as an induction drive system in which a rotational force for rotating the rotor is produced through interaction of rotor-induced eddy currents from each of the first and second phases with respective magnetic fluxes of the other of the first and second phases.

41. The method of claim 40, wherein the rotor provides the mirror facets.

42. The method of claim 40 further comprising mounting a member distinct from the rotor on the shaft providing the mirror facets.

43. The method of claim 40, wherein the rotor comprises a sheet of conductive material.

44. The method of claim 40, wherein the rotor comprises a sheet of conductive material comprising aluminum.

45. The method of claim 40, wherein the input voltage source is configured to produce two phase-shifted input voltages.

46. The method of claim 40, wherein the input voltage source is configured to produce two phase-shifted input voltages, and the act of positioning the pole pieces comprises positioning two pole pieces 90-degrees relative to one another.

47. A method comprising:
applying phase-shifted voltages to respective phases of a multi-phase induction drive system of a laser printing device scanning assembly;
responsive to said applying, inducing eddy currents in a rotor and magnetic fluxes that interact with the eddy currents sufficient to cause rotation of a mirror comprising part of the scanning assembly;
directing a laser towards the rotating mirror;
scanning a photoconductor with a laser reflected off of the mirror; and
responsive to said scanning, producing a printed image on a print medium.

48. The method of claim 47, wherein the act of applying comprises applying two phase-shifted voltages.

49. The method of claim 47, wherein the act of applying comprises applying at least two phase-shifted voltages.

50. The method of claim 47, wherein the act of inducing rotation of the mirror comprises using the mirror as a rotor of the induction active system.

51. The method of claim 47, wherein the act of inducing rotation of the mirror comprises not using the mirror as a rotor of the induction drive system.

* * * * *

UNITED STATES PATENT AND TRADEMARK OFFICE
CERTIFICATE OF CORRECTION

PATENT NO. : 7,180,534 B2  
APPLICATION NO. : 10/636878  
DATED : February 20, 2007  
INVENTOR(S) : B. Mark Hirst It is certified that error appears in the above-identified patent and that said Letters Patent is hereby corrected as shown below:

In column 6, line 11, delete "niece" and insert -- piece --, therefor.

In column 6, line 43, after "laser" insert -- beam --.

In column 8, line 23, in Claim 13, delete "produces" and insert -- produced --, therefor.

In column 8, line 36, in Claim 17, after "wherein" insert -- the --.

In column 8, line 45, in Claim 19, delete "current" and insert -- currents --, therefor.

In column 9, line 13, in Claim 28, delete "claim 21" and insert -- claim 20 --, therefor.

In column 9, line 45, in Claim 34, delete "at last" and insert -- at least --, therefor.

In column 10, line 60, in Claim 50, delete "active" and insert -- drive --, therefor.

Signed and Sealed this

Eighteenth Day of November, 2008

JON W. DUDAS  
*Director of the United States Patent and Trademark Office*